(12) United States Patent
Mayer et al.

(10) Patent No.: US 7,193,355 B2
(45) Date of Patent: Mar. 20, 2007

(54) REFLECTION LAYERS FORMED FROM AN ALUMINUM OXIDE PARTICLE MIXTURE

(75) Inventors: Sylvain Mayer, München (DE); Ulrich Müller, München (DE); Martin Zachau, Geltendorf (DE)

(73) Assignee: Patent-Treuhand-Gesellschaft fuer elektrische Gluehlampen mbH, Munich (DE)

( * ) Notice: Subject to any disclaimer, the term of this patent is extended or adjusted under 35 U.S.C. 154(b) by 429 days.

(21) Appl. No.: 10/946,111

(22) Filed: Sep. 22, 2004

(65) Prior Publication Data

US 2005/0073240 A1    Apr. 7, 2005

(30) Foreign Application Priority Data

Oct. 1, 2003   (DE) ................ 103 45 771

(51) Int. Cl.
*H01J 1/62*    (2006.01)

(52) U.S. Cl. ..................... 313/489; 313/635

(58) Field of Classification Search ............. 313/489, 313/113, 635; 252/582; 430/140
See application file for complete search history.

(56) References Cited

FOREIGN PATENT DOCUMENTS

GB    1 559 589    1/1980

*Primary Examiner*—Vip Patel
(74) *Attorney, Agent, or Firm*—Robert F. Clark

(57) ABSTRACT

An aluminum oxide particle mixture for reflection layers in discharge lamps, and to discharge lamps of this type. The mixture has a first coarse-grained component and a second fine-grained component, with a primary grain size of preferably $d_{50}(1)$ between 0.3 μm and 0.5 μm and $d_{50}(2)$ of at most 0.05 μm, respectively (with an agglomerated size of the fine particles of less than 0.15 μm).

17 Claims, 2 Drawing Sheets

REFLECTION LAYERS FORMED FROM AN ALUMINUM OXIDE PARTICLE MIXTURE

TECHNICAL FIELD

The invention relates to an aluminum oxide particle mixture which can be used for reflection layers in discharge lamps.

In discharge lamps, gas discharges generate radiation outputs in the UV region, including what is known as the VUV region (with wavelengths below 200 nm), which lamps for illumination applications convert into radiation outputs in the visible region using phosphors or phosphor mixtures. However, the UV radiation itself is used for certain technical applications.

BACKGROUND ART

It is known per se for discharge lamps, in addition to phosphor layers, also to have reflection layers which reflect the UV radiation generated or the visible radiation generated by the phosphor toward certain desired light outlet or phosphor surfaces and/or away from other surfaces. By way of example, electrode-free discharge lamps have bulbs in the discharge vessel in which devices for the inductive firing and maintaining of the discharge are accommodated. Reflection layers formed from aluminum oxide particles are already to be found in the prior art on bulbs of this type.

DISCLOSURE OF THE INVENTION

The present invention is based on the problem of providing an aluminum oxide particle mixture which is suitable for applications in reflection layers in discharge lamps and represents an improvement over the prior art.

The invention relates to an aluminum oxide particle mixture, having
a first mixture component comprising aluminum oxide particles with a grain size $d_{50}(1)$, measured using a CPS disk centrifuge, of
$0.3 \ \mu m \leq d_{50}(1) \leq 0.5 \ \mu m$,
and a second mixture component comprising aluminum oxide particles having a very fine TEM-measured primary grain size $d_{50}(2)$ of
$d_{50}(2) \leq 0.05 \ \mu m$
and a grain size measured using a CPS disk centrifuge of
$d_{50,agg}(2) \leq 0.15 \ \mu m$,
the first mixture component forming a relative proportion $m(1)$ of
$m(1) \leq 86\%$ by weight,
and the second mixture component forming a relative proportion $m(2)$ of
$0\%$ by weight $< m(2) < 4\%$ by weight.

In addition, the invention relates to a discharge lamp having a correspondingly composed reflection layer, and to the use of the aluminum oxide particle mixture given above for such a purpose.

Preferred configurations of the invention are given in more detail in the text which follows. The features disclosed are in each case to be understood as referring both to the aluminum oxide particle mixture itself and to the corresponding reflection layer and discharge lamp and finally also to the use of the aluminum oxide particle mixture.

The basic principle of the invention is for there to be at least two mixture components, a first one of which contains relatively coarse aluminum oxide particles. The prior art tends to use aluminum oxide with as fine grains as possible for reflection layers, in order to produce layers which are as far as possible free of pores and exhibit good adhesion. However, the inventors have surprisingly been able to establish that although finer materials make it possible, at small layer thicknesses, to obtain higher reflectance values than material with coarser grains, these relationships are reversed in the case of thicker layers. In particular, the material with coarser grains makes it possible to achieve higher reflectance saturation values as the layer weight increases.

Furthermore, it has been found that one typical shortcoming of the material aluminum oxide, namely the way in which the reflectance values are dependent on the light wavelength (spectral reflectance gradient) is much more pronounced with relatively fine-grained material than with coarser-grained material. This is because relatively fine-grained material has a higher reflection under relatively short-wave light than under longer-wave light, resulting in color locus shifts in fluorescent lamps. This problem can be reduced and in some cases even eliminated altogether by the invention.

Unfortunately, the details concerning grain sizes in aluminum oxide particle reflection layers given in the literature are based on different measurement conditions. For cost reasons, laser scattering measurements are almost exclusively used, yet such measurements give relatively unreproducible results, firstly on account of the tendency of aluminum oxide particles to agglomerate, and secondly on account of the different types of equipment. The inventors are of the opinion that particle sizes can best be determined by sedimentation measurements using a disk centrifuge, in which case good initial dispersion and stabilization of the specimens should be ensured.

Under these conditions, the grain size of the first mixture component according to the invention can be characterized by a value which is generally denoted by $d_{50}$, which indicates that in the particle size distribution 50% of the particles are smaller than or equal to the $d_{50}$ value given, and the remaining 50% of the particles are larger than or equal to the $d_{50}$ value given. In this context, the percentages are to be understood as percentages by weight (% by weight). In this case, the measurement was carried out using a CPS disk centrifuge of type DC 18000. For the first mixture component, this resulted in $d_{50}$ values of between 0.3 µm and 0.5 µm. The values 0.32 µm, 0.35 µm and 0.38 µm in this order are increasingly preferred as the lower limit for the range indicated. Conversely, the values 0.47 µm, 0.45 µm and 0.42 µm in this order are increasingly preferred as the upper limit. Therefore, the range which is most favorable in the opinion of the inventors is $0.38 \ \mu m \leq d_{50}(1) \leq 0.42 \ \mu m$ (the numeral 1 following $d_{50}$ stands for the first mixture component).

Moreover, however, according to the invention there is also a second mixture component, comprising particularly fine particles, which is responsible for ensuring sufficient layer bonding. The first mixture component therefore has parameters which are substantially determined by the desired reflection properties, whereas the second mixture component is responsible for ensuring sufficient cohesion within the layer, which can present a certain problem in the case of coarse-grained material. However, the demands imposed on layer bonding should not be exaggerated, and in particular the more fine-grained material of the second mixture component should be prevented from noticeably interfering with the reflection properties.

Therefore, the second mixture component forms a relative proportion of less than 4% by weight of the mixture. More preferred values for this relative proportion of the second mixture component, referred to as m(2), are m(2)≦3.5% by weight, or preferably m(2)≦3.0% by weight, most expediently m(2)≦2.5% by weight. If the demands imposed on the layer bonding are not particularly high, it is possible for the second mixture component, as has been stated, to be present in relatively small quantities. However, it is preferable for the relative proportion of the second mixture component m(2) to be ≧0.5% by weight, or more expediently ≧1.0% by weight, and most expediently ≧1.5% by weight. This makes it possible to achieve increasingly good bonding properties.

The relative proportion of the first mixture component, referred to here by m(1), is usually at least 86% by weight.

In this context, the invention provides for the $d_{50}$ value of the second mixture component ($d_{50}(2)$) to be at most 0.05 μm. This is to be understood as meaning the primary grain size of this material, which in this size range can be determined more easily using TEM examinations (transmission electron microscopy) than, for example, by sedimentation measurements. More preferred values for the primary grain size $d_{50}(2)$ of the second mixture component are at most 0.035 μm, particularly preferably at most 0.02 μm. On the other hand, preferred primary grain size values for this component are at least 0.005 μm. It should be added that such fine aluminum oxide material has a strong tendency to agglomerate, and indeed is at least partially in agglomerated form in the reflection layers. According to the invention, the $d_{50}$ values with regard to the agglomerated particles, referred to here by $d_{50,agg}(2)$, should be at most 0.15 μm. This value is within a range which is still accessible to sedimentation measurements, and consequently this measurement is once again based on sedimentation measurement.

It should be noted that within the context of the invention further constituents of the mixture are permitted in addition to the two mixture components described above, these further constituents preferably likewise being aluminum oxide particles. The relative proportion of further mixture components should as far as possible be no greater than 10% by weight, preferably no greater than 5% by weight or 2% by weight. Aluminum oxide particles with grain sizes between the two mixture components described are particularly suitable. Material with considerably coarser grains than the first mixture component would have an adverse effect on layer bonding, at least if it were present in a significant quantity. The second mixture component, on the other hand, has been specifically selected in such a way as to produce particularly fine aluminum oxide particles, specifically down to a range of 5 nm and below, and consequently material with even finer grains is not fundamentally suitable. However, there could be aluminum oxide material with primary grain sizes of, for example, $d_{50,remainder} \leq 0.3$ μm, preferably 0.2 μm.

According to further preferred configurations of the invention, the overall mixture can be characterized by what is known as the BET surface area, which is preferably between 3 m²/g and 7 m²/g, for preference between 3.5 m²/g and 6.5 m²/g, and particularly preferably between 4 m²/g and 6 m²/g, wherein the narrower limits are also preferred independently of one another.

The literature in some instances also characterizes aluminum oxide particle mixtures using the product of this specific BET surface area and the $d_{50}$ value for the primary grain size. The invention preferably provides the following relationships for this product BET*$d_{50}$: 0.0009 m³/kg≦BET*$d_{50}$≦0.0035 m³/kg, preferably 0.0012 m³/kg≦BET*$d_{50}$≦0.0031 m³/kg, particularly preferably 0.0015 m³/kg≦BET*$d_{50}$≦0.0027 m³/kg, with the narrower limit values once again also being preferred independently of one another.

In use as a reflection layer in a discharge lamp, furthermore, it is preferable to provide a relatively great layer thickness, wherein what is known as the layer weight SG, i.e. the density per unit area of the mass, should as far as possible be at least 5 mg/cm², preferably at least 6.5 mg/cm², and particularly preferably at least 7.5 mg/cm². As has already been mentioned in the introduction, thick layers lead to saturation of the reflectance values at a relatively high level, although no further significant improvements are achieved beyond a certain limit. Therefore, the reflection layers according to the invention should as far as possible not exceed 30 mg/cm², preferably should not exceed 20 mg/cm², particularly preferably should not exceed 15 mg/cm², and finally very particularly preferably should not exceed 12.5 mg/cm².

One important and preferred application is in what are known as silent discharge lamps, which are designed for dielectric barrier discharges. The xenon excimer lamps are particularly suitable. Significant technical progress has been made in this field in recent years, leading to attractive uses for such lamps. Suitable examples include discharge lamps in rod form ("linear radiators") for office automation equipment, for example for scanners, photocopiers and the like, or flat disk-like discharge lamps ("areal radiators") for interior illumination and in particular for the backlighting of monitors, screens and similar display devices. In these discharge lamps, it is generally desirable for light to emerge in one specific direction, for example in the case of the linear radiators through a slot running along the longitudinal direction (known as an aperture lamp) and in the case of areal radiators toward one of the two flat sides. Therefore, reflection layers are particularly important in these applications.

BRIEF DESCRIPTION OF THE DRAWINGS

In the text which follows, the invention is explained in more detail on the basis of exemplary embodiments, in which individual features disclosed may also be pertinent to the invention in other combinations. In the drawing.

BEST MODE FOR CARRYING OUT THE INVENTION

Figure 1:
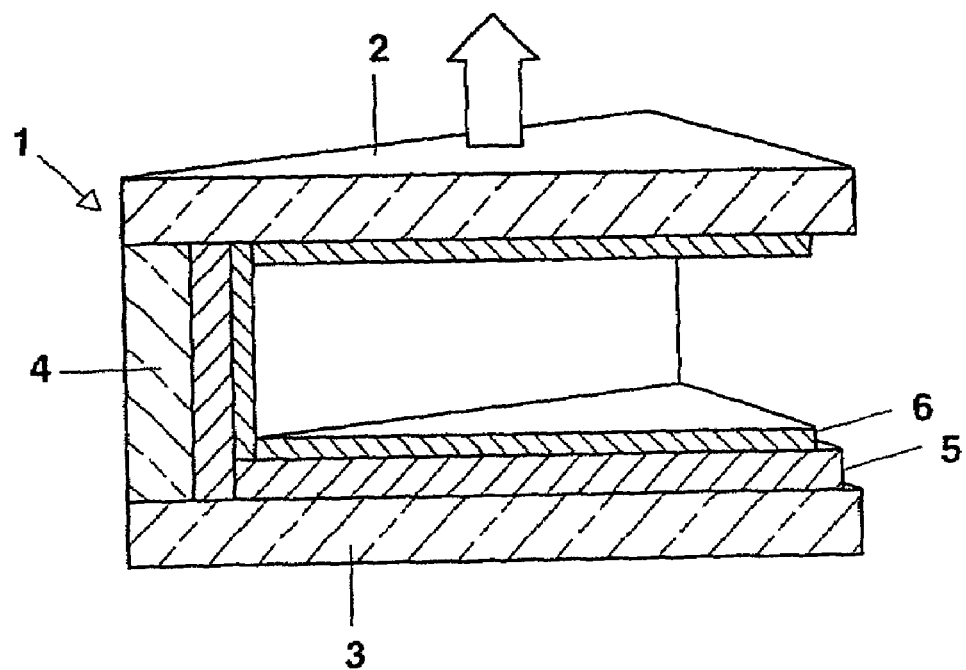
FIG. 1 shows a perspective diagrammatic illustration through a cut-out part from a flat radiator designed for dielectric barrier discharges.

FIG. 1 shows a diagrammatically illustrated part 1 of an areal radiator designed for dielectric barrier discharges. A discharge vessel has an upper glass plate 2 and a lower glass plate 3, which are connected via a lateral glass frame 4. The upper glass plate 2 serves as a light discharge surface, as indicated by the arrow shown in FIG. 1. This light discharge side is used, for example, for the backlighting of an LCD display.

The structural details of flat radiators of this type are known per se and need not be repeated here. FIG. 1 does not deal with such details. In particular, actual discharge vessels are under certain circumstances of rather more complex design. Furthermore, FIG. 1 does not show any electrodes, dielectric layers on the electrodes and other significant parts. The electrodes could also be located outside the discharge vessel, in which case the discharge vessel parts serve as dielectric barrier layers.

However, firstly a reflection layer 5 on the lower glass plate 3 and on the frame 4 and secondly a phosphor layer 6, which covers the entire inner surface of the discharge vessel, are shown in the drawing inside the discharge vessel. The phosphor layer 6 serves to convert the VUV light generated in the xenon excimer discharge into visible light. The reflection layer 5 serves to reflect the visible light which is generated into the interior of the discharge vessel and toward the upper glass plate 2. The present application does not require the reflection layer 5 to reflect UV, since in the VUV region there is in any case only a slight reflection in aluminum oxide particle layers and UV radiation of medium wavelengths is not formed in dielectric barrier xenon excimer discharges. However, this situation may differ with other types of discharge lamps.

Figure 2:
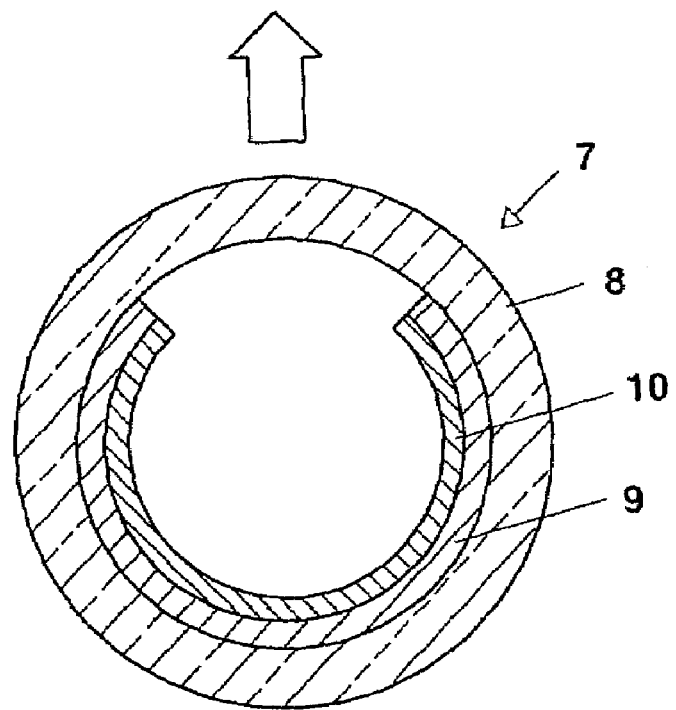
FIG. 2 shows a sectional diagrammatic illustration of a linear radiator designed for dielectric barrier discharges.

FIG. 2 shows a second example, illustrating a section through a linear radiator 7. The discharge vessel has a cylindrical glass tube 8, which, apart from an opening (aperture) of just under 90°, with respect to the longitudinal axis of the glass tube 8, in this case arranged at the top, is covered with a reflection layer 9 located on the inner side of the glass tube 8 and a phosphor layer 10 located on the reflection layer 9.

In this case too, the technical structure is somewhat simplified, and in particular the electrical parts are not included in the drawing.

According to the invention, the reflection layers 5 and 9 are produced using an aluminum oxide particle mixture comprising two mixture components. The first mixture component is a relatively coarse aluminum oxide material manufactured by Baikowski, type designation CR1. The second mixture component is a very fine aluminum oxide powder produced by Degussa, designation aluminum oxide C. CR1 is an α-aluminum oxide, whereas aluminum oxide C is a γ-aluminum oxide.

Figure 3:
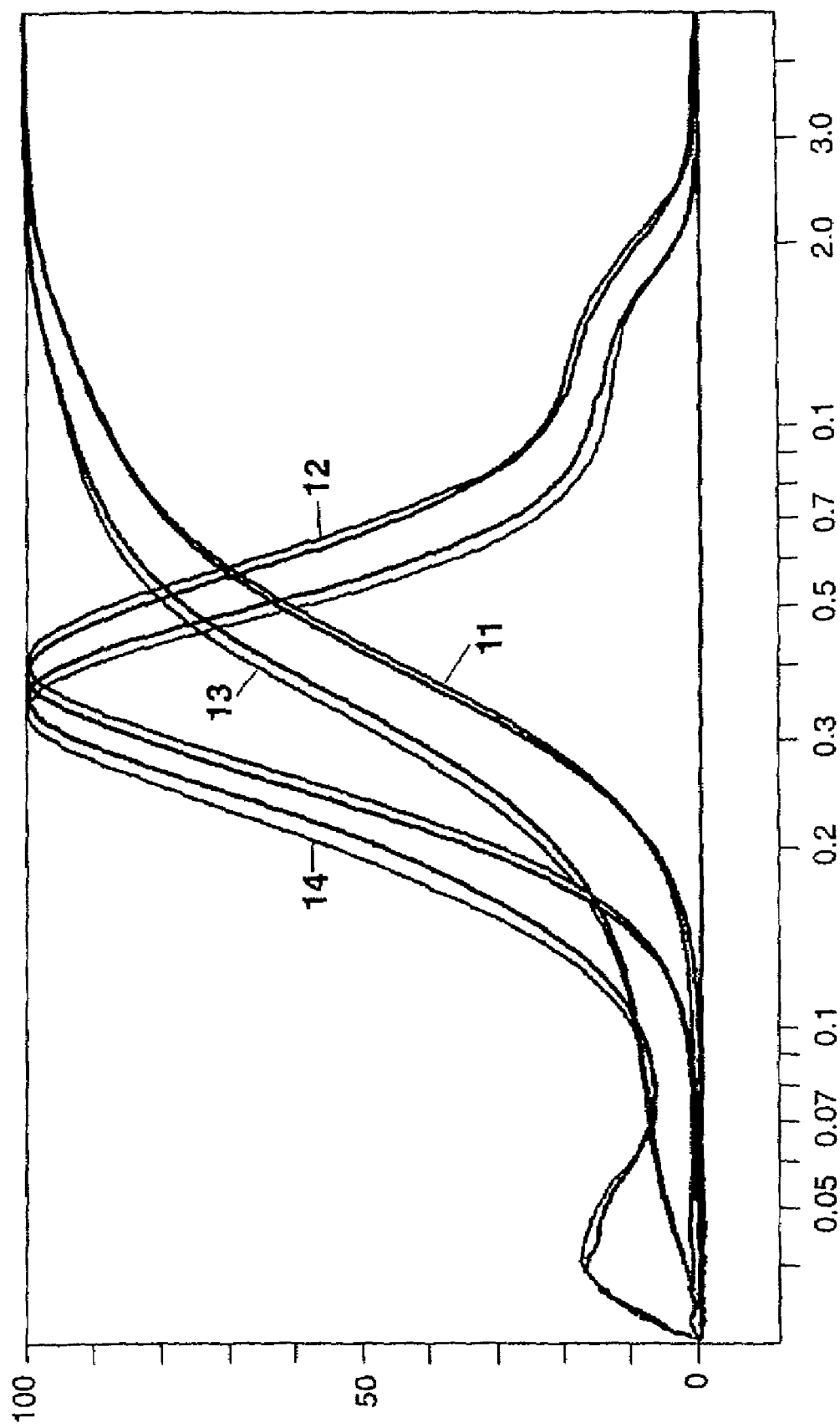
FIG. 3 shows measurement curves for a sedimentation measurement measuring the particle size.

FIG. 3 shows measurements carried out using the above-mentioned disk centrifuge CPS DC 18000, with the horizontal axis giving the particle size in μm on a logarithmic scale and the vertical axis giving the percent by weight with respect to some of the curves.

In FIG. 3, the individual curves are each plotted in duplicate, which are repetition measurements intended to illustrate the reproducibility. In the text which follows, the pairs of curves are in each case dealt with without any differentiation between the two repetition measurements. The pair of curves 11 shows an integral measurement for the material CR1, i.e. for the first mixture component. Starting from the left-hand side, this gives the proportion in % by weight of the particles which have a smaller measured particle size. It can therefore be seen that approximately 50% by weight of the material CR1 has a particle size of at most 0.4 μm, and a further 50% by weight has a particle size of at least 0.4 μm. The distribution range $b_{80}=(d_{90}-d_{10})/d_{50}$ is in this case 2.0, with the values $d_{90}$ and $d_{10}$ in turn meaning that 90% by weight and 10% by weight, respectively, have a smaller primary grain size. The pair of curves 12 corresponds to the first derivatives of the pair of curves 11 and accordingly shows a vertex at approximately 0.4 μm.

The pair of curves 13 shows the mixture according to the invention of the material CR1 with the second mixture component aluminum oxide C, in which context, with regard to the relative proportions, m(1) is 98% by weight and m(2) is 2% by weight. The first derivatives are indicated by 14.

Even comparing the pairs of curves 11 and 13, and more clearly comparing the first derivatives 12 and 14, reveal that the mixture according to the invention has a second fraction with a $d_{50}$ value of the order of magnitude of 0.04–0.05 μm. This is the aluminum oxide C fraction. According to additional TEM examinations, independent of FIG. 3, the aluminum oxide C has a primary grain size of the order of magnitude of 10 nm. Our own additional REM examinations revealed an agglomerate size of approximately 100 nm. The measurement shown in FIG. 3 certainly shows influences of agglomerates, and possibly on account of the sedimentation measurement method and the associated thorough dispersion with the use of ultrasound, slightly smaller values than the agglomerate size of 100 nm.

The measurement of 0.4 μm for the material CR1 is substantially the primary grain size, firstly on account of the larger grain size and reduced tendency to agglomerate, and secondly on account of the initial dispersion and stabilization prior to the measurement.

Further mixture components were not used here.

The layer weight of the reflection layers 5 and 9 is SG=10 mg/cm². Beyond this value, in the tests the reflection gradient of the spectral reflectance became negligible and it was possible to achieve a very high reflectivity of 98%, measured against an optically dense, pressed aluminum oxide specimen. The gradient disappeared for the wavelength in the visible region from 380–780 nm.

Comparative tests have shown that admixing the second mixture component aluminum oxide C had no adverse affect on the reflection properties but did significantly improve the layer bonding, bringing it into a range which can be achieved with (unmixed) fine aluminum oxide particles.

In principle, all coating processes which are customary from the known prior art, such as for example electrostatic powder coating, electrophoretic deposition, spray coating, slurry processes, dipping processes, doctor-blade application, etc., can be used to produce the reflection layers comprising the aluminum oxide particle mixtures according to the invention. By way of example, if a slurry process is used, the aluminum oxide particle mixture is dispersed with water or an organic solvent together with a proportion of a few percent by weight of a suitable highly molecular organic compound which is soluble in the respective solvent, known as the binder, for example polyethylene oxide or nitrocellulose, to form a slurry-like paste and is applied to the glass surfaces in such a way that after drying a uniform layer with a defined layer weight is formed, the dried binder producing a stable film-like structure. Immediately prior to the joining and closure of the discharge vessel, the organic binder is removed by firing at temperatures of between typically 400–600° C., so that what remains in the lamp is the reflection layer consisting exclusively of the aluminum oxide particle mixture according to the invention.

What is claimed is:

1. An aluminum oxide particle mixture, having a first mixture component comprising aluminum oxide particles with a grain size $d_{50}(1)$, measured using a CPS disk centrifuge, of 0.3 μm ≦ $d_{50}(1)$ ≦ 0.5 μm, and a second mixture component comprising aluminum oxide particles having a very fine TEM-measured primary grain size $d_{50}(2)$ of $d_{50}(2)$ ≦ 0.05 μm and a grain size measured using a CPS disk centrifuge of $d_{50,agg}(2)$ ≦ 0.15 μm, the first mixture component forming a relative proportion m(1) of $m(1) \leq 86\%$ by weight, and the second mixture component forming a relative proportion $m(2)$ of 0% by weight $\leq m(2) < 4\%$ by weight.

2. The aluminum oxide particle mixture as claimed in claim 1, in which the following statement applies to the grain size of the first mixture component:

$d_{50}(2) \geq 0.32$ µm, preferably $d_{50}(1) \geq 0.35$ µm, particularly preferably $d_{50}(1) \geq 0.38$ µm.

3. The aluminum oxide particle mixture as claimed in claim 1, in which the following statement applies to the grain size of the first mixture component:

$d_{50}(1) \leq 0.47$ µm, preferably $d_{50}(1) \leq 0.45$ µm, particularly preferably $d_{50}(1) \leq 0.42$ µm.

4. The aluminum oxide particle mixture as claimed in claim 1, in which the following statement applies to the primary grain size of the second mixture component:

$d_{50}(2) \leq 0.035$ µm, preferably $d_{50}(2) \leq 0.02$ µm.

5. The aluminum oxide particle mixture as claimed in claim 1, in which the following statement applies to the primary grain size of the second mixture component:

$d_{50}(2) \geq 0.005$ µm.

6. The aluminum oxide particle mixture as claimed in claim 1, in which the following statement applies to the relative proportion of the second mixture component:

$m(2) \leq 0.5\%$ by weight, preferably $m(2) \geq 1.0\%$ by weight, particularly preferably $m(2) \geq 1.5\%$ by weight.

7. The aluminum oxide particle mixture as claimed in claim 1, in which the following statement applies to the relative proportion of the second mixture component:

$m(2) \leq 3.5\%$ by weight, preferably $m(2) \leq 3.0\%$ by weight, particularly preferably $m(2) \leq 2.5\%$ by weight.

8. The aluminum oxide particle mixture as claimed in claim 1, which, in addition to the first and second mixture components, contains only aluminum oxide particle mixture components in a relative proportion $m(3)$ of $m(3) \leq 10\%$ by weight, preferably $m(3) \leq 5\%$ by weight, particularly preferably $m(3) \leq 2\%$ by weight.

9. The aluminum oxide particle mixture as claimed in claim 8, in which the following statement applies to the grain size $d_{50,remainder}$ of the remaining aluminum oxide particles, measured using a CPS disk centrifuge:

$d_{50,remainder} \leq 0.3$ µm.

10. The aluminum oxide particle mixture as claimed in claim 1, which has a specific BET surface area BET of $3\ m^2/g < BET < 7\ m^2/g$ preferably $3.5\ m^2/g < BET < 6.5\ m^2/g$, particularly preferably $4\ m^2/g < BET < 6\ m^2/g$.

11. The aluminum oxide particle mixture as claimed in claim 1, in which the following statement applies to the product of the specific BET surface area and the grain size $d_{50}$ of the mixture, measured using a CPS disk centrifuge:

$0.0009\ m^3/kg \leq BET*d_{50} \leq 0.0035\ m^3/kg$, preferably $0.0012\ m^3/kg \leq BET*d_{50} \leq 0.0031\ m^3/kg$, particularly preferably $0.0015\ m^3/kg \leq BET*d_{50} \leq 0.0027\ m^3/kg$.

12. A discharge lamp having a reflection layer formed from the aluminum oxide particle mixture as claimed in claim 1.

13. The discharge lamp as claimed in claim 12, in which the reflection layer has a layer weight SG of $SG \geq 5\ mg/cm^2$, preferably $SG \geq 6.5\ mg/cm^2$, Particularly preferably $SG \geq 7.5\ mg/cm^2$.

14. The discharge lamp as claimed in claim 12, in which the reflection layer has a layer weight SG of $SG \leq 30\ mg/cm^2$, preferably $SG \leq 20\ mg/cm^2$, particularly preferably $SG \leq 15\ mg/cm^2$, very particularly preferably $SG \leq 12.5\ mg/cm^2$.

15. The discharge lamp as claimed in claim 12, which is designed for a dielectric barrier discharge, in particular for a xenon excimer discharge.

16. The use of the aluminum oxide particle mixture as claimed in claim 1 as a reflection layer for a discharge lamp.

17. The aluminum oxide particle mixture as claimed in claim 2, in which the following statement applies to the grain size of the first mixture component:

$d_{50}(1) \leq 0.47$ µm, preferably $d_{50}(1) \leq 0.45$ µm, particularly preferably $d_{50}(1) \leq 0.42$ µm.

* * * * *